US012044050B2

(12) United States Patent

Bollmeier

(10) Patent No.: US 12,044,050 B2

(45) Date of Patent: Jul. 23, 2024

(54) HINGE

(71) Applicant: Hettich-ONI GmbH & Co. KG, Vlotho (DE)

(72) Inventor: Claudia Bollmeier, Paderborn (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 69 days.

(21) Appl. No.: 17/793,691

(22) PCT Filed: Jan. 18, 2021

(86) PCT No.: PCT/EP2021/050904

§ 371 (c)(1),
(2) Date: Jul. 19, 2022

(87) PCT Pub. No.: WO2021/151697

PCT Pub. Date: Aug. 5, 2021

(65) Prior Publication Data

US 2023/0046661 A1 Feb. 16, 2023

(30) Foreign Application Priority Data

Jan. 30, 2020 (DE) ..................... 10 2020 102 316.2

(51) Int. Cl.
*E05D 11/00* (2006.01)
*E05D 3/16* (2006.01)

(52) U.S. Cl.
CPC ............ *E05D 11/0054* (2013.01); *E05D 3/16* (2013.01); *E05D 2003/166* (2013.01);
(Continued)

(58) Field of Classification Search
CPC . E05D 11/0054; E05D 3/16; E05D 2003/166; E05Y 2600/53; E05Y 2800/674; E05Y 2800/676; E05Y 2900/20
See application file for complete search history.

(56) References Cited

U.S. PATENT DOCUMENTS 4,856,141 A * 8/1989 Sassenberg ............... E05D 5/08 16/250
4,870,716 A * 10/1989 Grass .................... E05D 5/0276 16/250
(Continued)

FOREIGN PATENT DOCUMENTS

AT 360 861 B 2/1980
DE 44 18 238 A1 11/1995
(Continued)

OTHER PUBLICATIONS

International Search Report of PCT/EP2021/050904, mailed Mar. 29, 2021.
(Continued)

*Primary Examiner* — Christine M Mills
*Assistant Examiner* — Matthew J Sullivan
(74) *Attorney, Agent, or Firm* — Collard & Roe, P.C.

(57) ABSTRACT

A hinge or an item of furniture or a domestic appliance has a first hinge part and a second hinge part, which are interconnected via a lever mechanism having seven articulation pins and levers articulated thereon. The first hinge part has a first connecting piece and the second hinge part has a second connecting piece which are arranged parallel and spaced apart in a closed position of the hinge; and a cover element at least partially covers the lever mechanism on at least three sides in order to make it impossible to reach between the levers of the lever mechanism. A plurality of cover plates are formed integrally with the cover element, and the cover plates arranged on one side of the lever mechanism can be partially overlappingly pivoted relative to one another when the hinge is pivoted. The possibility of reaching into the lever mechanism is thereby prevented.

20 Claims, 13 Drawing Sheets

(52) U.S. Cl.
CPC ..... *E05Y 2600/53* (2013.01); *E05Y 2800/674* (2013.01); *E05Y 2800/676* (2013.01); *E05Y 2900/20* (2013.01)

(56) References Cited

U.S. PATENT DOCUMENTS

| | | | | |
|---|---|---|---|---|
| 6,935,400 | B1 * | 8/2005 | Welsh | E05D 15/242 16/370 |
| 7,774,899 | B2 * | 8/2010 | Braunlich | E05F 3/227 16/49 |
| 8,225,459 | B2 * | 7/2012 | Waltemate | E05F 5/02 16/371 |
| 8,978,205 | B2 * | 3/2015 | Kim | E05D 11/0054 16/251 |
| 9,927,841 | B2 * | 3/2018 | Gheorghiu | G06F 1/1681 |
| 10,190,347 | B2 * | 1/2019 | Batistakis | E05D 11/0054 |
| 10,385,598 | B2 * | 8/2019 | Shah | E05D 3/122 |
| 11,021,901 | B2 * | 6/2021 | Thielmann | E05D 11/0054 |
| 11,414,908 | B2 * | 8/2022 | Salice | E05D 3/16 |
| 11,473,359 | B2 * | 10/2022 | Windmann | E05D 11/0054 |
| 2003/0205001 | A1 * | 11/2003 | Williams | E05D 11/0054 49/383 |
| 2005/0155725 | A1 * | 7/2005 | Verheye | E05D 11/0054 160/229.1 |
| 2009/0241288 | A1 * | 10/2009 | Zetti | E05D 11/1064 16/236 |
| 2015/0361699 | A1 * | 12/2015 | Manzoni | E05D 11/0054 16/251 |
| 2017/0122016 | A1 * | 5/2017 | Lampitelli | E06B 7/28 |
| 2020/0131830 | A1 * | 4/2020 | Byun | E05D 11/0054 |
| 2021/0115715 | A1 * | 4/2021 | Kaspersen | E05D 3/02 |
| 2022/0145681 | A1 * | 5/2022 | Hageman | E05D 11/0054 |
| 2023/0323715 | A1 * | 10/2023 | Favero Gomes | E05D 11/0054 16/221 |

FOREIGN PATENT DOCUMENTS

| | | | |
|---|---|---|---|
| DE | 195 07 624 | A1 | 9/1996 |
| DE | 10 2016 123 498 | A1 | 6/2018 |
| EP | 2 129 852 | B1 | 5/2019 |

OTHER PUBLICATIONS

German Search Report dated Jun. 4, 2020 in German Application No. 10 2020 102 316.2 with English translation of relevant parts.

* cited by examiner

HINGE

CROSS REFERENCE TO RELATED APPLICATIONS

This application is the National Stage of PCT/EP2021/050904 filed on Jan. 18, 2021, which claims priority under 35 U.S.C. § 119 of German Application No. 10 2020 102 316.2 filed on Jan. 30, 2020, the disclosure of which is incorporated by reference. The international application under PCT article 21(2) was not published in English.

The present invention relates to a hinge for an item of furniture or a household appliance, comprising a first hinge part and a second hinge part which are pivotally connected to each other via a lever mechanism having seven joint axes and levers hinged thereto, wherein the first hinge part has a first web and the second hinge part has a second web, which are arranged so as to be substantially parallel and spaced apart in a closed position of the hinge, and a cover element at least partially covers the lever mechanism on at least three sides to prevent engagement between the levers of the lever mechanism.

DE 44 18 238 A1 discloses a multi-joint hinge which has a lever mechanism between two hinge elements which, when the hinge parts are pivoted, creates changing openings which are covered by a cover in the manner of a protective, cap. In this way, engagement with the openings can be prevented. Such an elastic protective cap can deform when the hinge is pivoted, but this leads to additional forces when the material is stretched. The protective cap also contains cavities and therefore is of comparatively large build.

It is therefore an object of the present invention to provide a hinge that provides improved engagement protection and is compact in design.

This object is solved with a hinge having the features of claim 1.

The hinge according to the invention comprises a cover element for the lever mechanism between the two hinge parts, wherein a plurality of cover plates are integrally formed with the cover element, and the cover plates arranged on one side of the lever mechanism are pivotable relative to each other in a partially overlapping position when the hinge is pivoted. The cover plates are thus movable relative to each other and can be adapted to the shape of the lever mechanism, wherein the cover plates can overlap each other when the hinge part is pivoted, so that the necessary installation space for the cover element is reduced.

Preferably, the cover plates arranged on one side are connected to each other via a flexible web or a film hinge or another connection with a joint axis. A film hinge forms a joint axis, while the flexible web can have a length of, for example, greater than 10 mm, in particular between 20 mm and 50 mm, in order to guide two cover plates movably together by a bending movement. Preferably, the cover plates are pivoted about an axis that is aligned parallel to the joint axes of the lever mechanism.

In one design, a plurality of cover plates is provided in each case on opposite sides of the lever mechanism, which cover plates are pivotable relative to each other and are integrally formed with the cover element. Preferably, three cover plates each are provided on opposite sides of the lever mechanism, although the number of cover plates can also be varied, depending on the design of the lever mechanism.

The cover element preferably has a section which is U-shaped in cross-section and strip-shaped, the legs of which are formed by the cover plates, which are held together by a connecting web. The connecting web can be formed beyond the area with the cover plates and then form a bendable web, at the end section of which two further cover plates are provided.

For easy assembly, the cover element can be slipped or snapped onto the lever mechanism. For this purpose, the cover element can have a tab with a recess for fixing to a lever of the lever mechanism. Alternatively or additionally, the cover element can also have a curved mounting tab that is inserted around a lever of the lever mechanism for fixing.

The cover element is preferably made from a punched and folded film of plastic, for example a biaxially oriented polyester film. Other films can also be used, with the thickness of the film preferably being between 0.05 mm to 0.5 mm. Alternatively, the cover element can be made of a thin metal sheet.

For a particularly compact structure, the first hinge part comprises a strip-shaped and, in cross-section, U-shaped section, with part of the cover element, in particular the part with a connecting web, being accommodated therein. As a result, the cover element with the cover plates does not protrude laterally beyond the hinge, but is arranged between the legs of the first hinge part. The hinge part with the U-shaped section can thereby have a web from which two legs extend essentially at right angles.

The hinge according to the invention is preferably used for household appliances, such as a refrigerator. However, it can also be used for furniture or other purposes.

The hinge according to the invention can also have a closing and/or opening damper. The damping can be located within the lever arms of the hinge.

The invention is explained in more detail below by means of an exemplary embodiment with reference to the accompanying drawings, wherein.

Figure 1A:
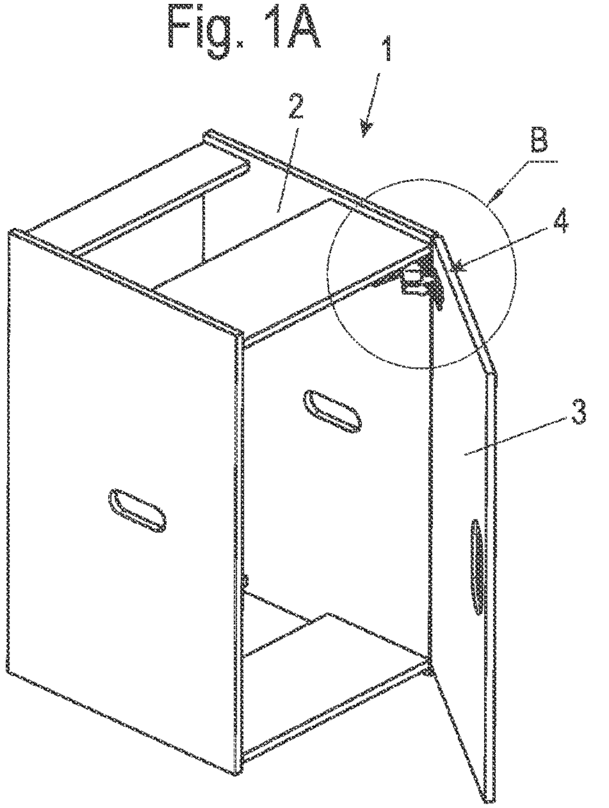
FIGS. 1A and 1B show two views of a hinge according to the invention in the assembled position.
Figure 1B:
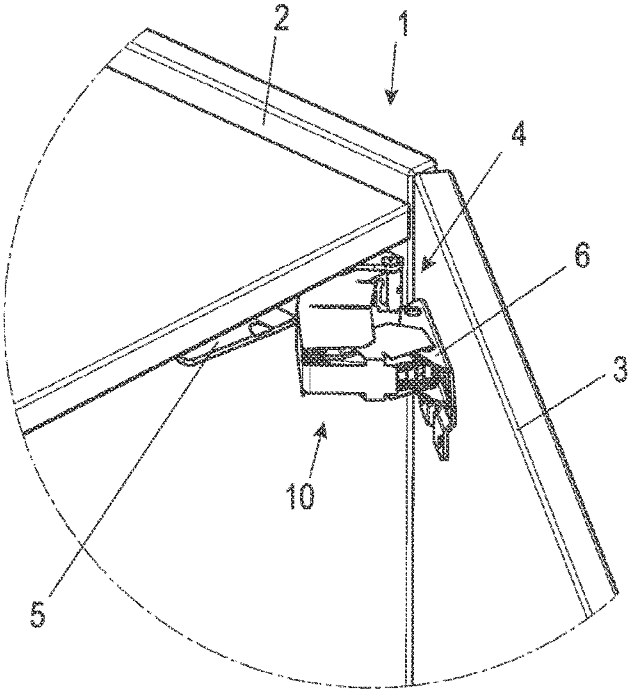

FIGS. 1A and 1B show a household appliance 1 or an item of furniture having a body 2 on which a door 3 is pivotably mounted via one or more hinges 4. A first hinge part 5 is thereby fixed to the body 2, while a second hinge part 6 is fixed to the door 3. A lever mechanism between the two hinge parts 5 and 6 is largely concealed via a cover element 10 to prevent engagement with the lever mechanism. FIG. 1B shows the area B designated in FIG. 1A in a detailed view.

In FIGS. 2A to 2E, the hinge 4 is shown in an open position. The hinge 4 comprises a lever mechanism with levers 8, each of which is hinged to at least two joint axes 7, wherein the two joint axes 7 are formed on the first hinge part 5, two joint axes 7 are formed on the second hinge part 6, and three further joint axes 7 are formed between the levers 8. Such a seven-joint hinge is disclosed, for example, in DE 10 2016 123 498 A1 or in EP 2 129 852 B1, to which reference is hereby made. In DE 10 2016 123 498 A1 or in EP 2 129 852 B1, a damper for such seven-joint hinges is also described which can also be used with the hinge 4, and reference is made to these documents.

The lever mechanism formed by the levers 8 is covered by a cover element 10, which has several cover plates 11, 12 and 13, each of which covers a partial area of the lever mechanism. The cover plates 11, 12 and 13 are movable relative to one another, wherein a flexible web 14 is provided between the cover plates 11 and 12 and a film hinge 15 is provided between the cover plates 12 and 13. The cover element 10 has a cover plate 11, 12 and 13 on opposite sides of the lever mechanism in each case, so that three cover plates 11, 12 and 13 are provided on opposite sides of the lever mechanism in each case. The cover element 10 is U-shaped in cross-section in the region of the cover plates 12 and 13 and has a connecting web 18 on the base side, on which the film hinge 15 is also formed. The bendable web 14, on which the two cover plates 11 are held, is formed as an extension of the connecting web 18.

The first hinge part 5 is provided with a strip-shaped section which is U-shaped in cross-section and has a web 51 from which two legs 52 extend substantially at right angles. The U-shaped receptacle thus formed serves to receive a portion of the cover element 10 in the closed position, wherein the cover plates 12 and 13 are disposed within the two legs 52. The first hinge part 5 can be connected to the body 2 at the web 51. In addition, a flange 50 is also formed on the first hinge part 5, which can also be used to fasten the first hinge part 5.

The second hinge part 6 comprises a web 61 that can be fixed to the door 3. An outwardly projecting flange 60 is formed on the web 61, which can also be used to fix it to the door 3.

Figure 2B:
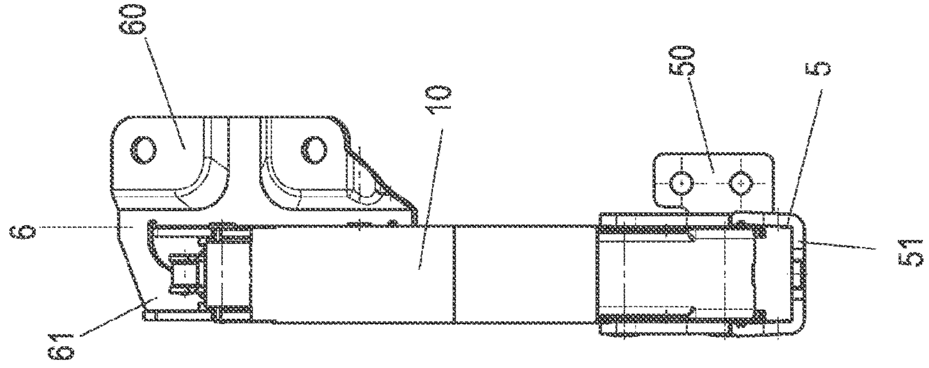
FIGS. 2A to 2E show multiple views of the hinge in an open position.
Figure 2A:
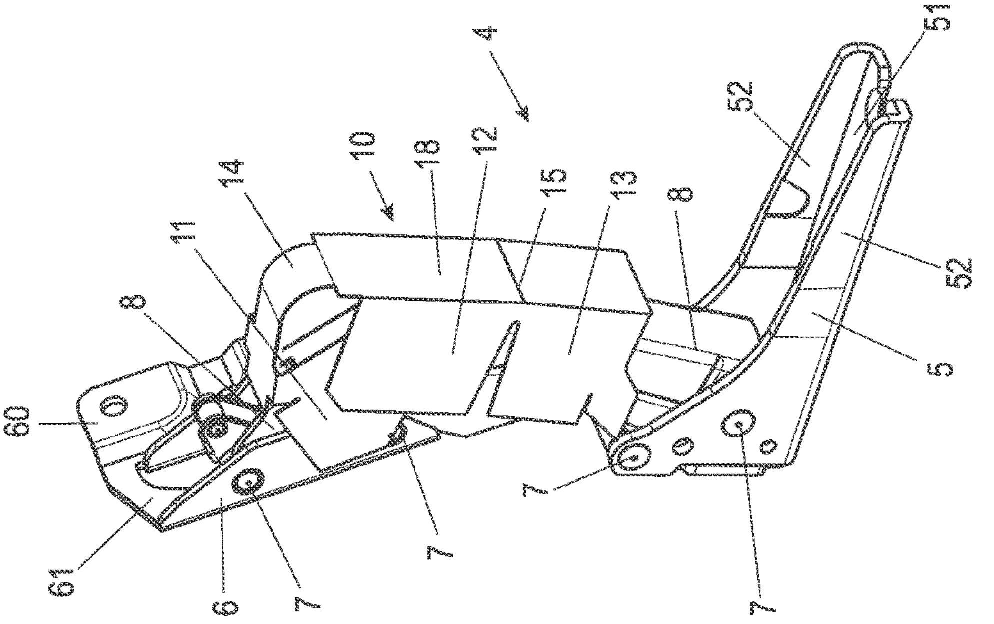
Figure 2D:
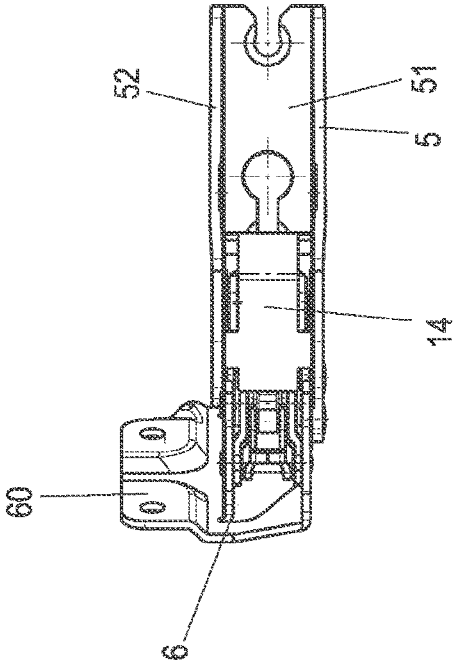
Figure 2C:
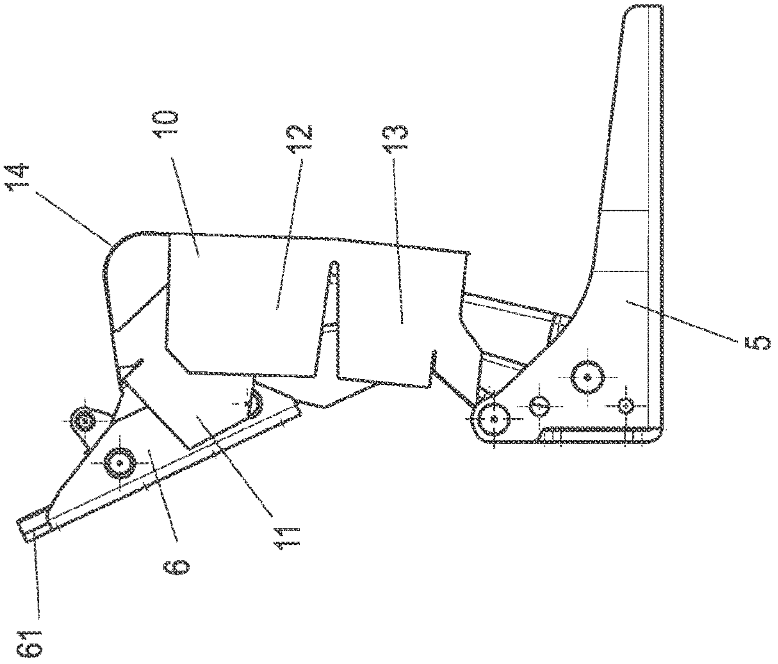
Figure 2E:
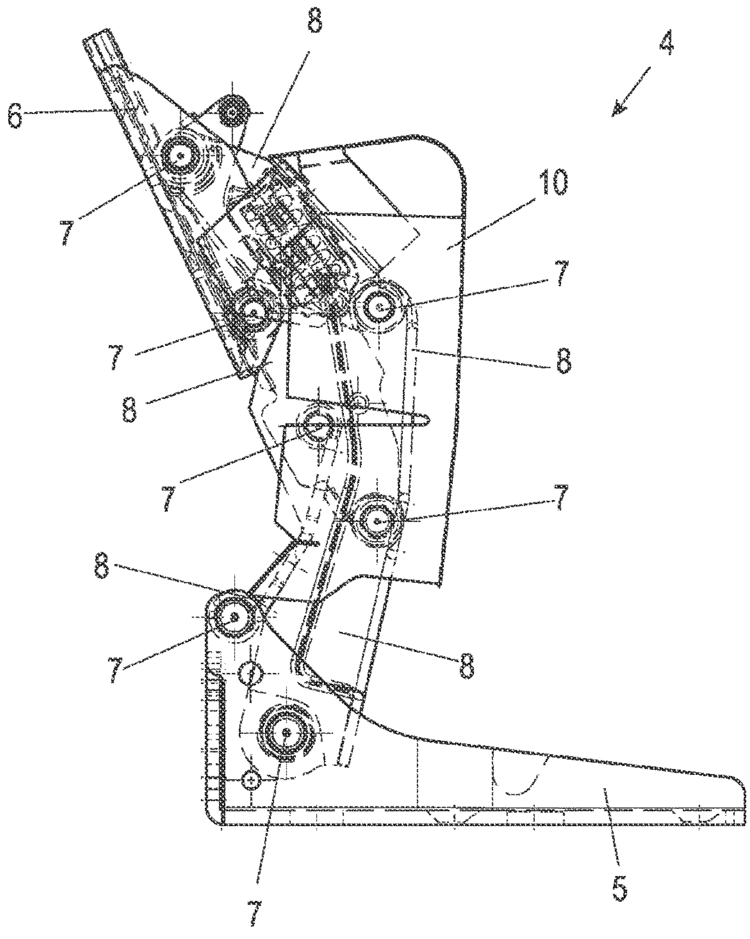
Figure 3B:
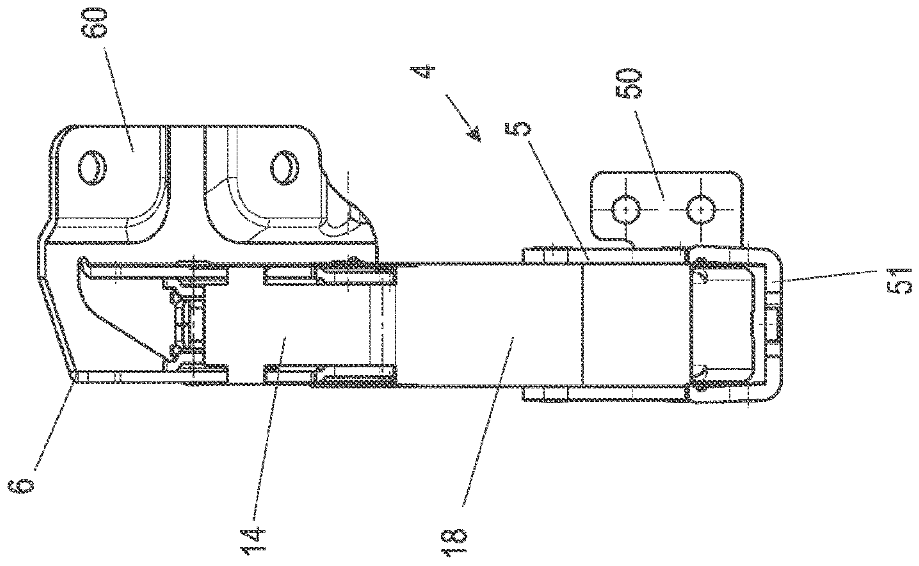
FIGS. 3A to 3E show multiple views of the hinge in a partially open position.
Figure 3A:
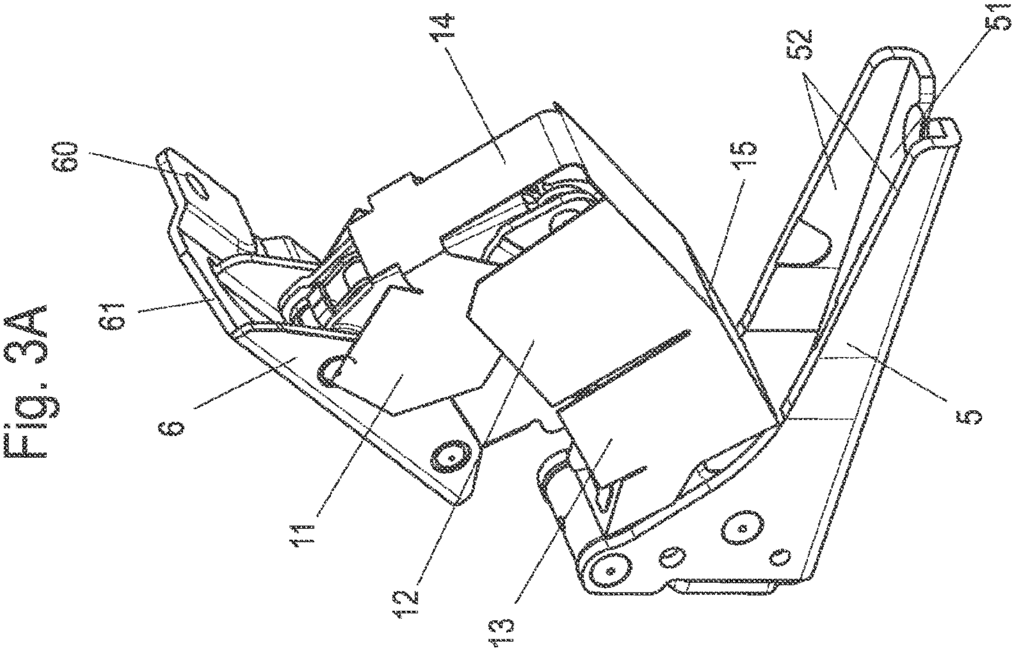
Figure 3D:
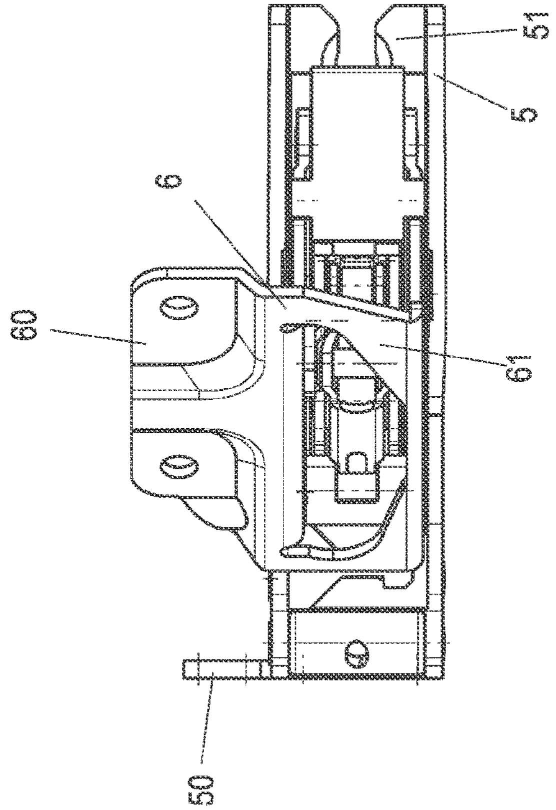
Figure 3C:
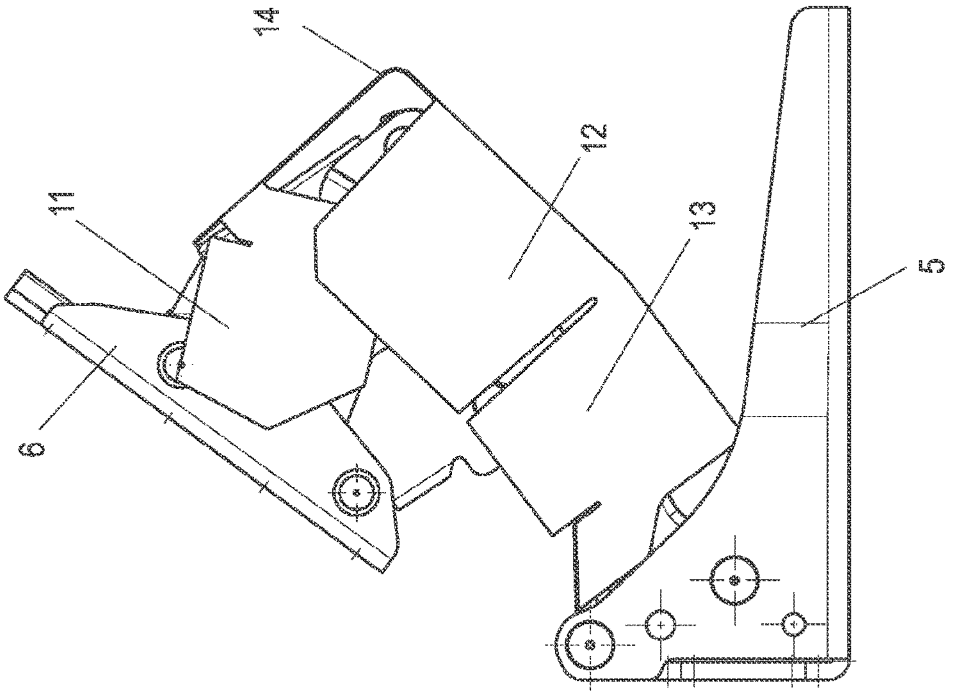
Figure 3E:
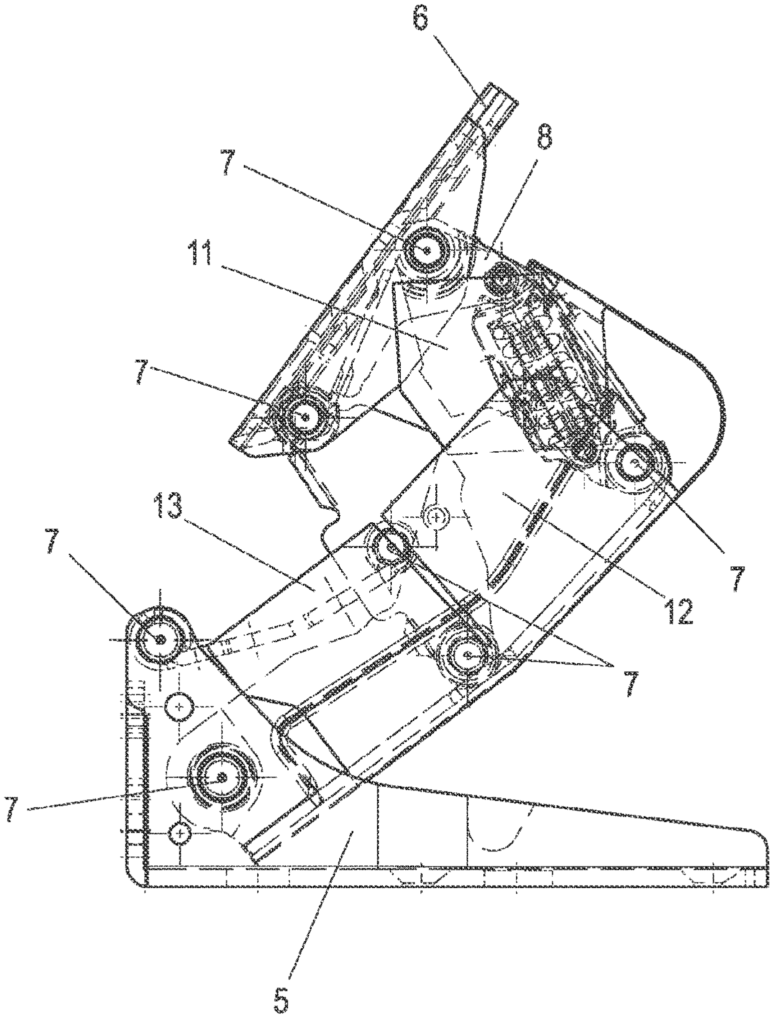

In FIG. 2E, the components covered by the cover element 10 are shown in dashed lines. It can be seen that a plurality of levers 8 are formed between the two hinge parts 5 and 6, which are interconnected by joint axes 7. In order to prevent engagement in openings between the levers 8, cover plates 11, 12 and 13 are provided which completely or largely cover these openings.

In FIGS. 3A to 3E, hinge 4 is shown in an only partially opened position, which lies between the maximum opening position according to FIG. 2 and a closed position according to FIG. 4. It can be seen that the hinge part 6 has been pivoted relative to the hinge part 5, changing the outer geometry of the lever mechanism with the levers 8. Also, the cover plate 11 has been pivoted relative to the cover plate 12, reducing the overlap area between the cover plates 11 and 12. Further, the slot between cover plates 12 and 13 has been reduced as cover plates 12 and 13 have also pivoted relative to each other. Despite the different position of the hinge parts 5 and 6 relative to each other, the openings between the levers 8 are covered by the cover plates 11, 12 and 13.

Figure 4A:
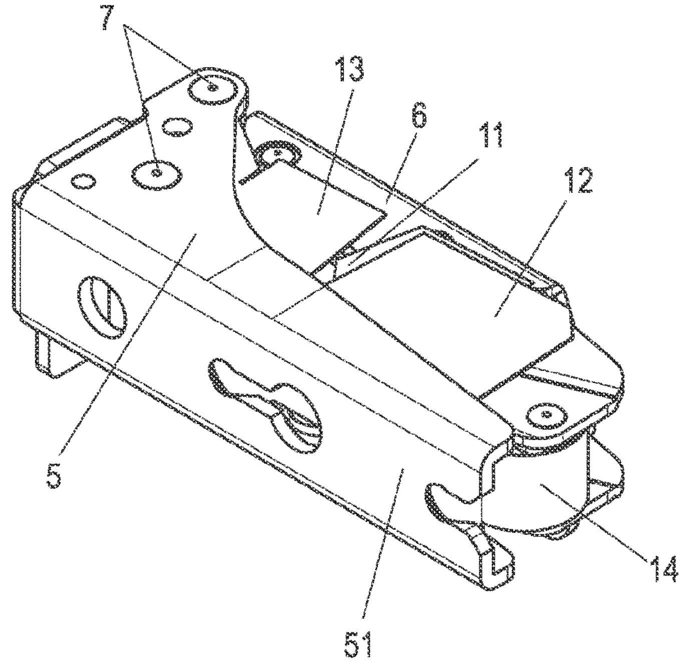
FIGS. 4A to 4D show multiple views of the hinge in a closed position.
Figure 4B:
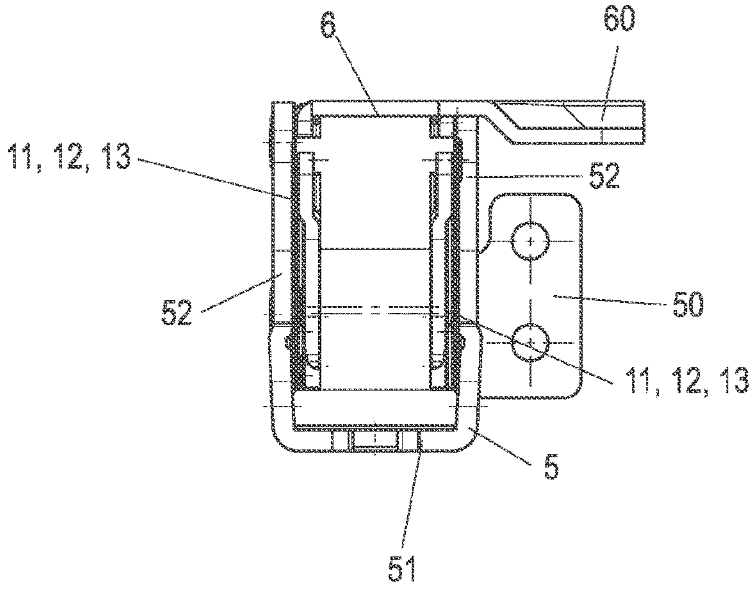
Figure 4C:
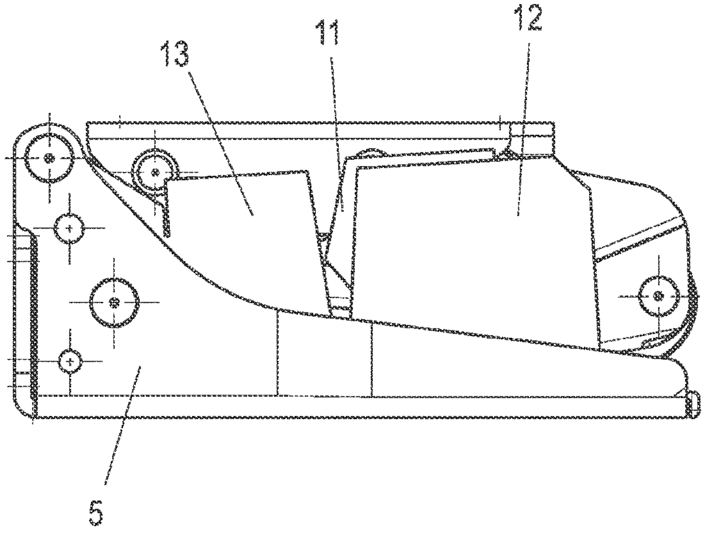
Figure 4D:
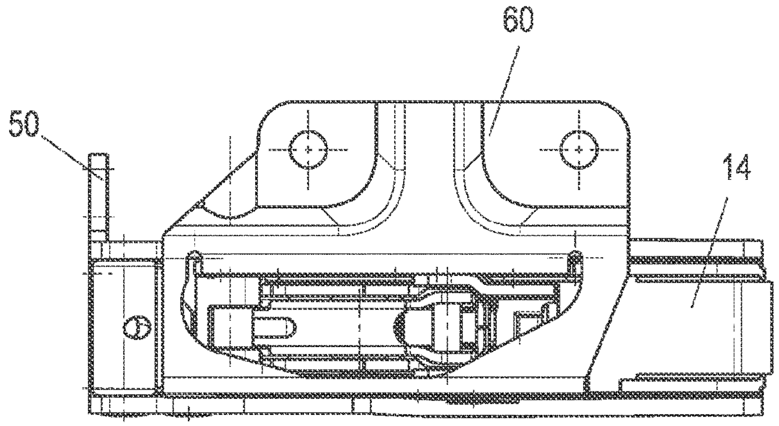
Figure 5A:
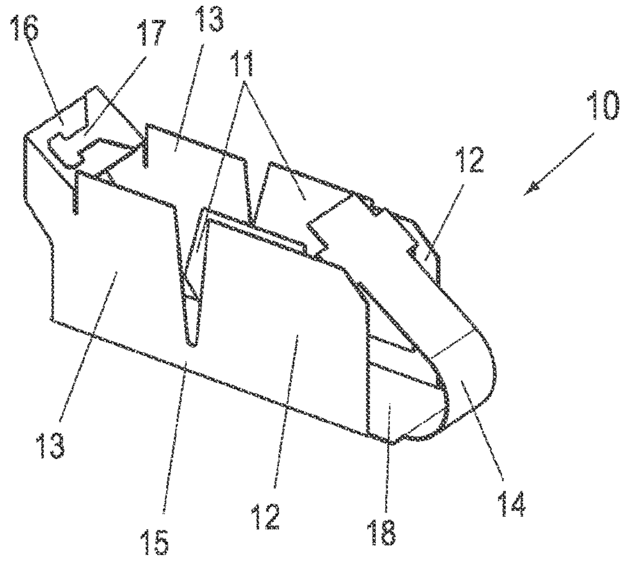
FIGS. 5A to 5D show multiple views of the cover element without the hinge.
Figure 5B:
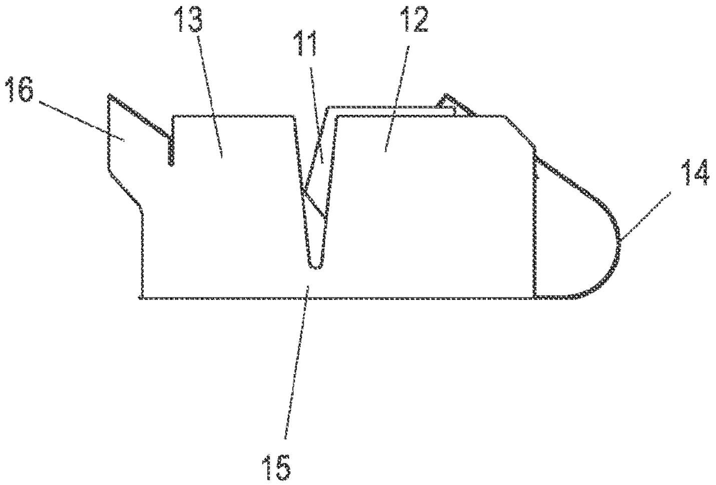
Figure 5C:
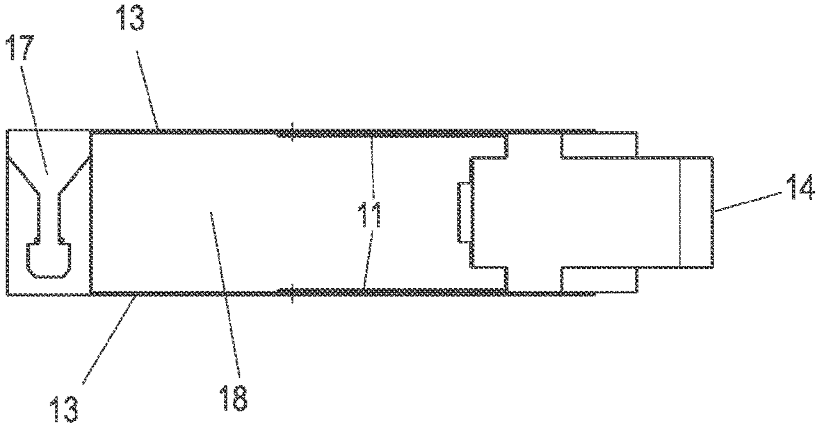
Figure 5D:
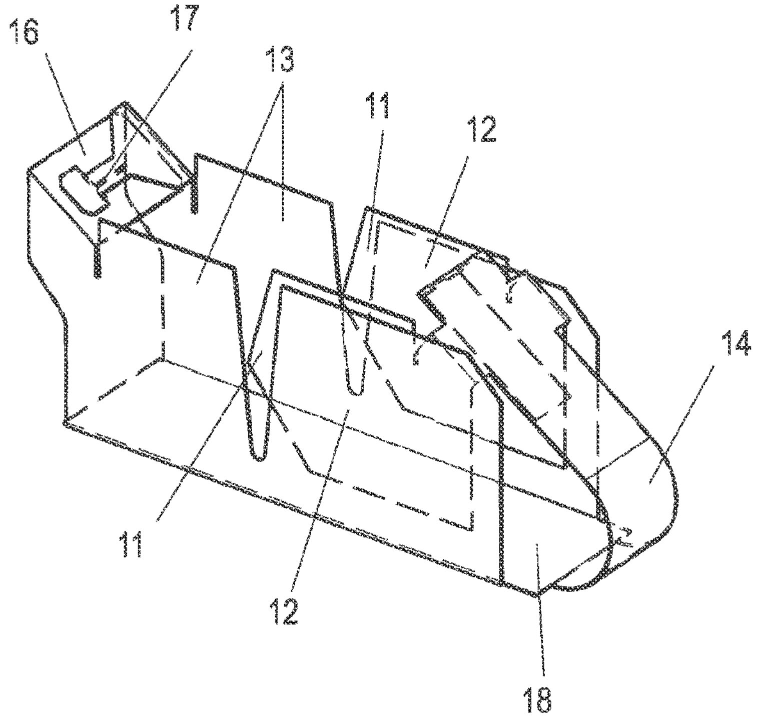

In FIGS. 4A to 4D, hinge 4 is shown in a closed position. In the closed position, the two webs 51 and 61 of hinge parts 5 and 6 are essentially parallel and spaced apart. In the closed position, the cover plate 11 has been brought into extensive overlap with the cover plate 12, i.e. an overlap of more than 80% of the area of the cover plate 11. The lever mechanism has a much more compact structure in the closed position of the hinge 4, so that the cover plates 11, 12 and 13 are also arranged in a correspondingly more compact manner, i.e. have a greater overlap than in a maximally open region of the hinge 4. In FIG. 4B, it can be seen that the cover plates 11, 12 and 13 lie between the two legs 52 of the U-shaped hinge part 5 in the closed state of the hinge 4.

In FIGS. 5A to 5D, the cover element 10 is shown without the hinge 4. The cover element 10 is made of a thin material, in particular a film or a thin metal sheet. If the cover element 10 is made of a plastic film, for example, a polyester film can be used.

For fixation to the lever mechanism, the cover element 10 includes two tabs 16 and 17 that are engageable with each other so that the cover element 10 can be secured to a lever 8 of the lever mechanism. This allows the cover element 10 to be clamped or latched to the lever mechanism. The tab 16 is partially integral with the cover plate 13 and forms a rigid unit therewith. A V-shaped slot is formed between the cover plates 12 and 13 to allow them to pivot relative to each other to a certain extent. The cover plate 11 is connected to the connecting web 18 via the bendable web 14, at which the cover plates 12 and 13 extend at an angle, in particular at right angles.

Figure 6A:
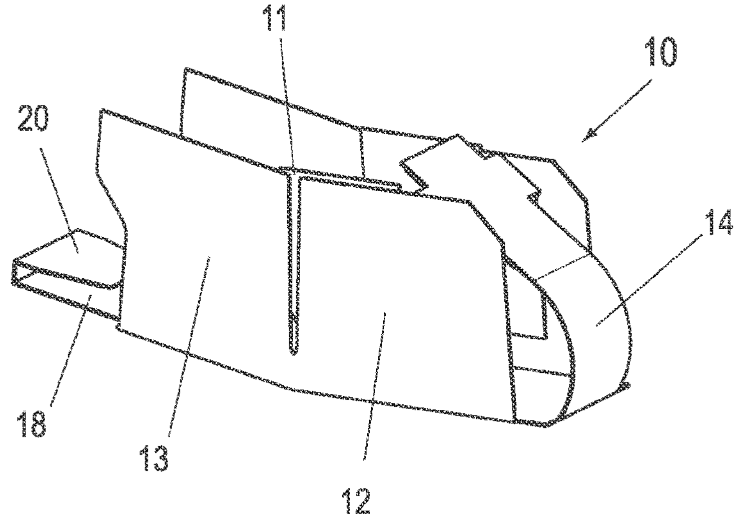
FIGS. 6A and 6B show two views of a modified cover element.

FIGS. 6A and B show a modified cover element 10 formed as in the first exemplary embodiment, but having a bent-over mounting tab 20 instead of tabs 16 and 17. The connecting web 18 extends beyond the cover plates 13 and is bent or folded over 180° away from the cover plates 13, so that the mounting tab 20 can be folded over about a lever 8 for fixation. The geometry of the cover plate 13 is slightly modified, but in all other respects the cover element is designed as in the first exemplary embodiment, in particular the cover plate 11 can be pivoted over the bendable web 14 and arranged overlapping from the cover plates 12 and 13.

Figure 6B:
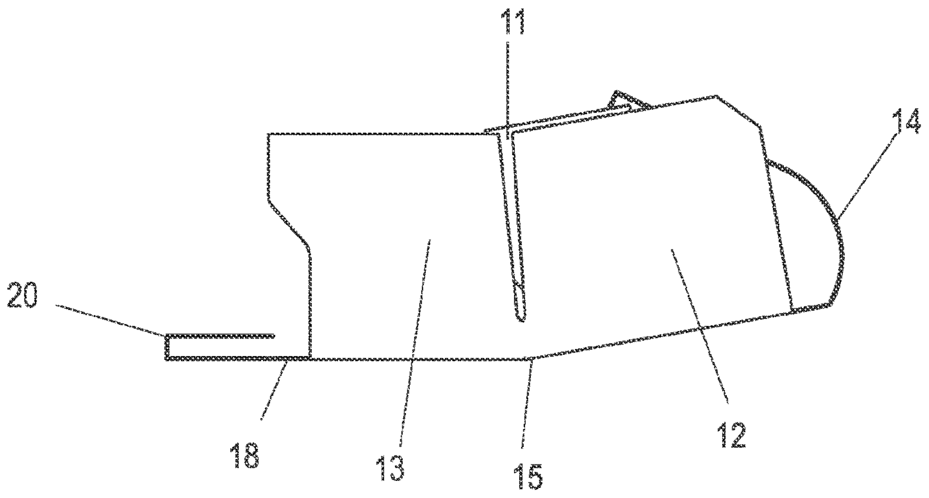
Figure 7:
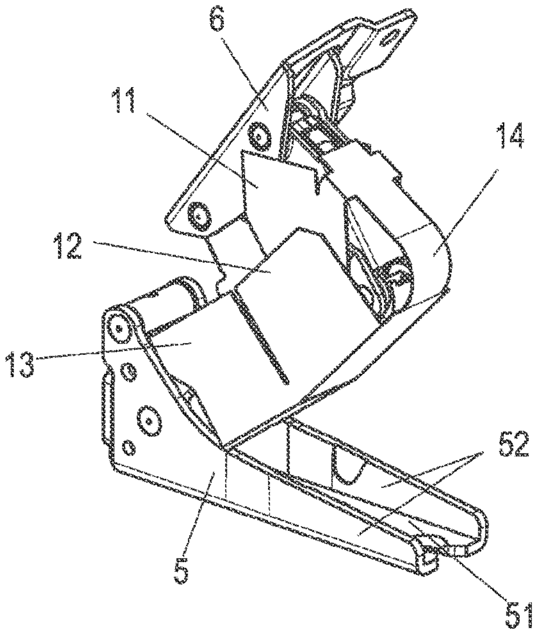
FIG. 7 shows a view of a hinge with the cover element of FIG. 6.

In FIG. 7, the hinge 4 is shown with the cover element 10 of FIG. 6, and it can be seen that the cover plate 11 is swung out from a position inside the two cover plates 12 at least in some areas when it is opened.

Figure 8:
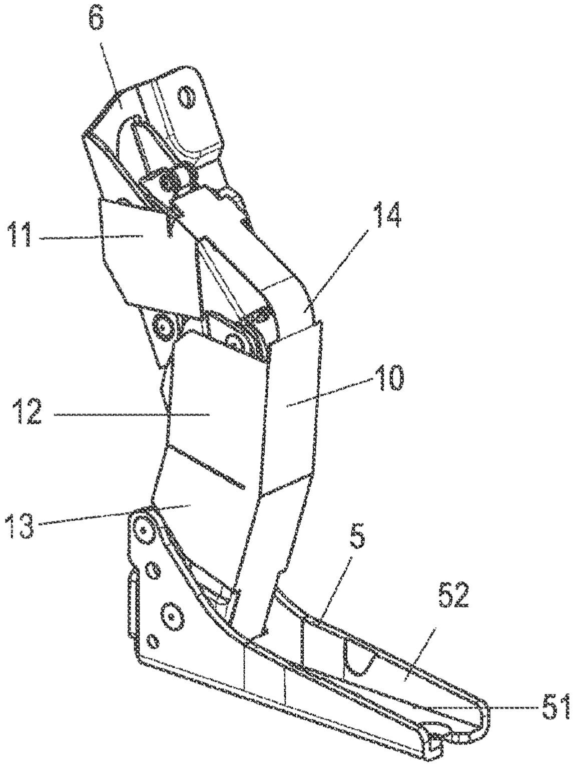
FIG. 8 shows a view of a hinge with the cover element of FIG. 6 in an open position.

In FIG. 8, a maximum opening position of the hinge 4 is shown, and it can be seen that the cover plate 11 of the cover element 10 is completely spaced from the cover plate 12, so that there is no longer any overlap. When the hinge part 6 is moved to the closed position, the cover plate 11 is again moved between the two cover plates 12 of the cover element 10.

In the exemplary embodiment shown, three cover plates 11, 12 and 13 are provided in each case on opposite sides of the lever mechanism. It is of course possible to change the number of cover plates, depending on the geometry of the lever mechanism in the individual positions of the hinge 4.

In a further design, the cover plates 11, 12 and 13 can also be connected to each other by further means, e.g. insertion tabs, in addition to the articulated connection. In this way, the cover plates can be prevented from bending away.

LIST OF REFERENCE SIGNS

1 Household appliance
2 Body
3 Door
4 Hinge
5 Hinge part
6 Hinge part
7 Joint axis
8 Lever
10 Cover element
11 Cover plate
12 Cover plate
13 Cover plate
14 Web
15 Film hinge
16 Tab
17 Tab

18 Connecting web
20 Mounting tab
50 Flange
51 Web
52 Leg
60 Flange
61 Web

The invention claimed is:

1. A hinge (4) for an item of furniture or a household appliance (1), comprising:

a) a first hinge part (5) and a second hinge part (6), which are pivotably connected to each other via a lever mechanism with seven joint axes (7) and levers (8) hinged thereto;

b) wherein the first hinge part (5) has a first web (51) and the second hinge part has a second web (61), which are arranged substantially parallel and spaced apart in a closed position of the hinge (4); and c) a cover element (10) that at least partially covers the lever mechanism on at least three sides to prevent engagement in openings between the levers (8) of the lever mechanism, wherein a plurality of cover plates (11, 12, 13) are integrally formed with the cover element (10), and the cover plates (11, 12, 13) arranged on one side of the lever mechanism are configured to be pivoted relative to each other in a partially overlapping manner when the hinge (4) is pivoted, wherein the first hinge part (5) has a section which is strip-shaped, and is U-shaped in cross-section, in which a part of the cover element (10) is received in the closed position of the hinge (4).

2. The hinge according to claim 1, wherein the cover plates (11, 12, 13) arranged on one side are connected to each other via a bendable web (14) or a film hinge (15).

3. The hinge according to claim 1, wherein a pivot axis of the cover plates (11, 12, 13) is aligned parallel to the joint axes (7) of the hinge (4).

4. The hinge according to claim 1, wherein the first hinge part (5) with the U-shaped section has a web (51) from which two legs (52) extend substantially at right angles.

5. The hinge according to claim 4, wherein the cover plates (11, 12, 13) lie between the two legs (52) of the U-shaped first hinge part (5) in the closed state of the hinge (4).

6. The hinge according to claim 1, wherein the plurality of cover plates (11, 12, 13) are formed on both opposite sides of the lever mechanism.

7. The hinge according to claim 1, wherein the cover element (10) has a section which is U-shaped in cross-section and whose legs are formed by at least two of cover plates (11, 12, 13) which are held against one another via a connecting web (18).

8. The hinge according to claim 7, wherein the connecting web (18) extends beyond the legs with the cover plates (12, 13) and forms a bendable web (14) on which two further cover plates (11) are provided at one end portion.

9. The hinge according to claim 1, wherein the cover element (10) is made of a punched and folded film of plastic or a thin metal sheet.

10. The hinge according to claim 1, wherein at least three of the cover plates (11, 12, 13) each are provided on opposite sides of the lever mechanism and are movable relative to each other when the hinge (4) is pivoted.

11. The hinge according to claim 1, wherein the cover element (10) comprises two tabs (16, 17) engageable with each other for fixing to one of the levers (8) of the lever mechanism.

12. The hinge according to claim 1, wherein the cover element (10) comprises a curved mounting tab (20) for fixing to one of the levers (8) of the lever mechanism.

13. A hinge (4) for an item of furniture or a household appliance (1), comprising:

d) a first hinge part (5) and a second hinge part (6), which are pivotably connected to each other via a lever mechanism with seven joint axes (7) and levers (8) hinged thereto;

e) wherein the first hinge part (5) has a first web (51) and the second hinge part has a second web (61), which are arranged substantially parallel and spaced apart in a closed position of the hinge (4); and f) a cover element (10) that at least partially covers the lever mechanism on at least three sides to prevent engagement in openings between the levers (8) of the lever mechanism, wherein a plurality of cover plates (11, 12, 13) are integrally formed with the cover element (10), and the cover plates (11, 12, 13) arranged on one side of the lever mechanism are configured to be pivoted relative to each other in a partially overlapping manner when the hinge (4) is pivoted, wherein the cover element (10) is plugged or snapped onto the lever mechanism.

14. The hinge according to claim 13, wherein the cover element (10) is made of a punched and folded film of plastic or a thin metal sheet.

15. The hinge according to claim 13, wherein at least three of the cover plates (11, 12, 13) each are provided on opposite sides of the lever mechanism and are movable relative to each other when the hinge (4) is pivoted.

16. The hinge according to claim 13, wherein the cover element (10) comprises two tabs (16, 17) engageable with each other for fixing to one of the levers (8) of the lever mechanism.

17. The hinge according to claim 13, wherein the cover element (10) comprises a curved mounting tab (20) for fixing to one of the levers (8) of the lever mechanism.

18. The hinge according to claim 13, wherein the plurality of cover plates (11, 12, 13) are formed on both opposite sides of the lever mechanism.

19. A hinge (4) for an item of furniture or a household appliance (1), comprising:

g) a first hinge part (5) and a second hinge part (6), which are pivotably connected to each other via a lever mechanism with seven joint axes (7) and levers (8) hinged thereto;

h) wherein the first hinge part (5) has a first web (51) and the second hinge part has a second web (61), which are arranged substantially parallel and spaced apart in a closed position of the hinge (4); and i) a cover element (10) that at least partially covers the lever mechanism on at least three sides to prevent engagement in openings between the levers (8) of the lever mechanism, wherein a plurality of cover plates (11, 12, 13) are integrally formed with the cover element (10), and the cover plates (11, 12, 13) arranged on one side of the lever mechanism are configured to be pivoted relative to each other in a partially overlapping manner when the hinge (4) is pivoted, wherein the hinge has a closing and/or an opening damping.

20. A refrigerator having a body (2) and a door (3) which is pivotably mounted on the body (2) via at least one hinge (4), comprising:

j) a first hinge part (5) and a second hinge part (6), which are pivotably connected to each other via a lever mechanism with seven joint axes (7) and levers (8) hinged thereto;

k) wherein the first hinge part (5) has a first web (51) and the second hinge part has a second web (61), which are arranged substantially parallel and spaced apart in a closed position of the hinge (4); and l) a cover element (10) that at least partially covers the lever mechanism on at least three sides to prevent engagement in openings between the levers (8) of the lever mechanism, wherein a plurality of cover plates (11, 12, 13) are integrally formed with the cover element (10), and the cover plates (11, 12, 13) arranged on one side of the lever mechanism are configured to be pivoted relative to each other in a partially overlapping manner when the hinge (4) is pivoted.

* * * * *